(12) United States Patent
Mizuno

(10) Patent No.: US 7,074,338 B2
(45) Date of Patent: Jul. 11, 2006

(54) FILTERING METHOD AND FILTERING DEVICE

(75) Inventor: Yuji Mizuno, Tokyo (JP)

(73) Assignee: Kabushiki Kaisha Nikuni, Kanagawa (JP)

(*) Notice: Subject to any disclaimer, the term of this patent is extended or adjusted under 35 U.S.C. 154(b) by 0 days.

(21) Appl. No.: 11/203,452

(22) Filed: Aug. 12, 2005

(65) Prior Publication Data
US 2006/0070962 A1    Apr. 6, 2006

(30) Foreign Application Priority Data
Oct. 1, 2004    (JP)    ............................ 2004-290159

(51) Int. Cl.
*B01D 37/02*    (2006.01)

(52) U.S. Cl. ...................... 210/777; 210/791; 210/798; 210/97; 210/193; 210/411; 210/778; 210/744

(58) Field of Classification Search ................ 210/777, 210/778, 193, 411
See application file for complete search history.

(56) References Cited

U.S. PATENT DOCUMENTS

| 2,348,885 | A | * | 5/1944 | Ditzen ........................ 210/143 |
| 3,137,652 | A | * | 6/1964 | Graue ........................ 210/331 |
| 3,200,105 | A | * | 8/1965 | Barber et al. ................ 528/482 |
| 3,212,639 | A | * | 10/1965 | Anderson .................... 210/104 |
| 3,244,286 | A | * | 4/1966 | Borre et al. ........... 210/333.01 |
| 3,409,551 | A | * | 11/1968 | Treat ......................... 508/180 |
| 3,438,502 | A | * | 4/1969 | Borre et al. ................. 210/232 |
| 3,907,681 | A | * | 9/1975 | Corrigan et al. ............. 210/777 |
| 4,153,552 | A | * | 5/1979 | Muther ........................ 210/769 |
| 4,174,282 | A | * | 11/1979 | Butterworth ................. 210/232 |
| 4,210,537 | A | * | 7/1980 | Butterworth et al. ..... 210/323.2 |
| 4,289,630 | A | * | 9/1981 | Schmidt et al. .............. 210/785 |
| 4,804,481 | A | * | 2/1989 | Lennartz ...................... 210/791 |
| 5,681,465 | A | * | 10/1997 | Takenoya et al. ......... 210/323.2 |
| 5,759,397 | A | * | 6/1998 | Larsson et al. .............. 210/331 |
| 5,897,788 | A | * | 4/1999 | Ketolainen et al. .......... 210/784 |
| 5,900,158 | A | * | 5/1999 | Ruokolainen et al. ....... 210/772 |
| 6,833,077 | B1 | * | 12/2004 | Flanagan ..................... 210/772 |
| 2006/0070962 | | * | 4/2006 | Mizuno ....................... 210/777 |

FOREIGN PATENT DOCUMENTS

JP            08-196821            8/1996

\* cited by examiner

*Primary Examiner*—Robert James Popovics
*Assistant Examiner*—T. Woodruff
(74) *Attorney, Agent, or Firm*—Dennis G. LaPointe

(57) ABSTRACT

Using the filter auxiliary agent separated by backwashing from a filter element repeatedly and effectively, the consumption amount of a filter auxiliary agent and the generation of industrial waste can be suppressed. In a filter auxiliary agent pre-coat circuit, a filter auxiliary agent in a pre-coat tank is attached and stacked on a filter element in a filter case, and a filter auxiliary agent layer is formed. In a filter circuit, the filter auxiliary agent layer of the filter element removes sludge in the filter treatment liquid in a main tank. A backwashing circuit breaks down the filter auxiliary agent layer and a sludge layer, separates the filter auxiliary agent layer and the sludge layer by backwashing from the filter element, and circulates to the pre-coat tank. After repeating these steps a plurality of times, the filter auxiliary agent and sludge separated by backwashing are taken out to the exterior.

6 Claims, 2 Drawing Sheets

FILTERING METHOD AND FILTERING DEVICE

INCORPORATION BY REFERENCE

The present application claims priority under U.S.C. §119 to Japanese Patent Application No. 2004-290159. The content of the application is incorporated herein by reference in its entirety.

1. Field of the Invention

The present invention relates to a filtering method and filtering device by means of a filter element on which a filter auxiliary agent is attached and stacked.

2. Background of the Invention

Conventionally, for example, as described in Japanese Laid-open Patent Publication No. 8-196821 (pages 2–3, FIG. 1), a filter element has been known. In the filter element, a filter auxiliary agent layer is formed by attaching and stacking a filter auxiliary agent such as diatomaceous earth on the outer surface of a spring filter in which a slight filtering space is formed between adjacent rings by winding a wire having projection parts formed on the outer surface in a coil shape and interposing the projection parts between the adjacent rings.

When a coolant liquid or the like discharged from a machine tool is filtered by the filter element, a sludge layer is piled up on the surface of the filter auxiliary agent layer, and the filter auxiliary agent layer is closed.

Under such circumstances, since the filtering function of the filter element is impaired, a so-called backwashing is performed, wherein the filter auxiliary agent layer and the sludge layer are broken down by backflowing the liquid to the filter element and are separated from the filter element.

After the filter auxiliary agent is conventionally used for the filter element once, the filter auxiliary agent separated by backwashing from the filter element is disposed as industrial waste.

Thus, since the filter auxiliary agent separated by backwashing from the filter element is treated as industrial waste, a large amount of filter auxiliary agents are required, and a large amount of industrial waste is generated. Thereby, a problem has existed in that the cost is increased.

The present invention has been accomplished in view of the foregoing and other problems. It is an object of the present invention to provide a filtering method and a filtering device capable of repeatedly and effectively using the filter auxiliary agent separated by backwashing from a filter element to suppress the consumption amount of the filter auxiliary agent and the generation of industrial waste and to reduce the cost.

SUMMARY OF THE INVENTION

The present invention provides a filtering method comprising: a filter auxiliary agent pre-coat step for flowing a filter auxiliary agent liquid accommodated in a pre-coat tank and containing a filter auxiliary agent in a forward direction to a filter element to circulate the filter auxiliary agent liquid to the pre-coat tank and for attaching and stacking the filter auxiliary agent on the filter element to form a filter auxiliary agent layer; a filtering step for flowing a filter treatment liquid accommodated in a main tank set independently from the pre-coat tank in the forward direction to the filter element to circulate the filter treatment liquid to the main tank and for removing sludge contained in the filter treatment liquid by the filter auxiliary agent layer of the filter element; and a backwashing step for flowing the filter auxiliary agent liquid in the pre-coat tank in an opposite direction to the filter element to break down the filter auxiliary agent layer and a sludge layer, for separating the filter auxiliary agent layer and the sludge layer by backwashing from the filter element, and for circulating to the pre-coat tank when the filter auxiliary agent layer of the filter element is clogged by the sludge layer. The filtering method can repeatedly and effectively use the filter auxiliary agent separated by backwashing from the filter element to suppress the consumption amount of the filter auxiliary agent and the generation of industrial waste and to reduce the cost by repeating the filter auxiliary agent pre-coat step for attaching and stacking the filter auxiliary agent contained in the filter auxiliary agent liquid in the pre-coat tank on the filter element to form the filter auxiliary agent layer, the filtering step for removing the sludge in the filter treatment liquid in the main tank by the filter auxiliary agent layer of the filter element, and the backwashing step for flowing the filter auxiliary agent liquid in the pre-coat tank in the opposite direction to the filter element to break down the filter auxiliary agent layer and the sludge layer, separating the filter auxiliary agent layer and the sludge layer by backwashing from the filter element, and circulating to the pre-coat tank when the filter auxiliary agent layer of the filter element is clogged by the sludge layer a plurality of times.

The filtering method of the present invention, further comprising: a recovery step for taking out the filter auxiliary agent and sludge separated by backwashing from the filter element to the exterior after repeating the filter auxiliary agent pre-coat step, the filtering step and the backwashing step a plurality of times; and a filter auxiliary agent charging step for replenishing the filter auxiliary agent taken out to the exterior in the recovery step to the pre-coat tank.

The filter auxiliary agent and sludge separated by backwashing from the filter element is taken out to the exterior by the recovery step and the taken-out filter auxiliary agent is replenished to the pre-coat tank by the filter auxiliary agent charging step after repeating the filter auxiliary agent pre-coat step, the filtering step and the backwashing step a plurality of times. Thereby, the sludge can be discharged to the outside of a filtering system while the filter auxiliary agent having a degraded function is replaced with a new one.

The present invention provides a filtering device comprising: a filter auxiliary agent pre-coat circuit for flowing a filter auxiliary agent liquid accommodated in a pre-coat tank and containing a filter auxiliary agent in a forward direction to a filter element to circulate the filter auxiliary agent liquid to the pre-coat tank and for attaching and stacking the filter auxiliary agent on the filter element to form a filter auxiliary agent layer; a filter circuit for flowing a filter treatment liquid accommodated in a main tank set independently from the pre-coat tank in the forward direction to the filter element and for circulating the filter treatment liquid to the main tank to remove sludge contained in the filter treatment liquid by the filter auxiliary agent layer of the filter element; and a backwashing circuit for flowing the filter auxiliary agent liquid in the pre-coat tank in an opposite direction to the filter element to break down the filter auxiliary agent layer and the sludge layer, separating the filter auxiliary agent layer and the sludge layer by backwashing from the filter element, and circulating to the pre-coat tank when the filter auxiliary agent layer of the filter element is clogged by a sludge layer. The filtering device can repeatedly and effectively use the filter auxiliary agent separated by backwashing from the filter element to suppress the consumption amount of the filter auxiliary agent and the generation of industrial waste and to reduce the cost by attaching and stacking the filter auxiliary agent contained in the filter auxiliary agent liquid in the pre-coat tank on the filter element to form the filter auxiliary agent layer by the filter auxiliary agent pre-coat circuit, by removing the sludge in the filter treatment liquid in the main tank by the filter auxiliary agent layer of the filter element in the filter circuit, and by flowing the filter auxiliary agent liquid in the pre-coat tank in the opposite direction to the filter element clogged by the sludge layer to break down the filter auxiliary agent layer and the sludge layer, and separating the filter auxiliary agent layer and the sludge layer by backwashing from the filter element to circulate to the pre-coat tank in the backwashing circuit.

The filter element of the filtering device of the present invention includes a series of metallic filters formed in a coil shape and provided so as to expand and shrink freely, and a filtering space formed between adjoining spiral parts of the metallic filters, set to the minimum according to the force energized in the compression direction at the time of filtering, and enlarged by backwashing liquid pressure supplied into the metallic filter at the time of backwashing. The filtering space formed between the adjoining spiral parts of the metallic filter is set to the minimum according to the force energized in the compression direction at the time of filtering in the filter element composed by the metallic filter formed in the coil shape and provided so as to expand and shrink freely. Thereby, the filter auxiliary agent is reliably attached and stacked on the metallic filter to form the filter auxiliary agent layer. Since the filtering space between the spiral parts of the metallic filter is enlarged by the backwashing liquid pressure supplied into the metallic filter at the time of backwashing, the filter auxiliary agent can be reliably separated by backwashing from the metallic filter.

The filtering device of the present invention, further comprising: a recovery device for taking out the filter auxiliary agent and the sludge to the exterior from the backwashing circuit; and a filter auxiliary agent charging device for replenishing the filter auxiliary agent taken out to the exterior by the recovery device to the pre-coat tank. The filter auxiliary agent and sludge is taken out to the exterior from the backwashing circuit by the recovery device, and the taken-out filter auxiliary agent is replenished to the pre-coat tank by the filter auxiliary agent charging device. Thereby, the sludge can be discharged to the outside of a filtering system while the filter auxiliary agent having a degraded function is replaced with a new one.

The filtering device of the present invention, further comprising: a liquid level sensor for detecting the liquid level of the filter auxiliary agent liquid provided in the pre-coat tank; and a switching valve for switching the filter treatment liquid circulated in the filter circuit to the pre-coat tank when the liquid level detected by the liquid level sensor is below a lower limit setting value. The liquid level sensor detects the liquid level of the filter auxiliary agent liquid provided in the pre-coat tank. When the liquid level is below the lower limit setting value, since the filter treatment liquid circulated in the filter circuit is supplied into the pre-coat tank by the switching valve, it is not necessary to set an independent water supply circuit to the pre-coat tank, and the equipment can be simplified.

DETAILED DESCRIPTION OF THE INVENTION

Hereinafter, the present invention will be described with reference to one embodiment shown in FIG. 1 and FIG. 2.

Figure 1:
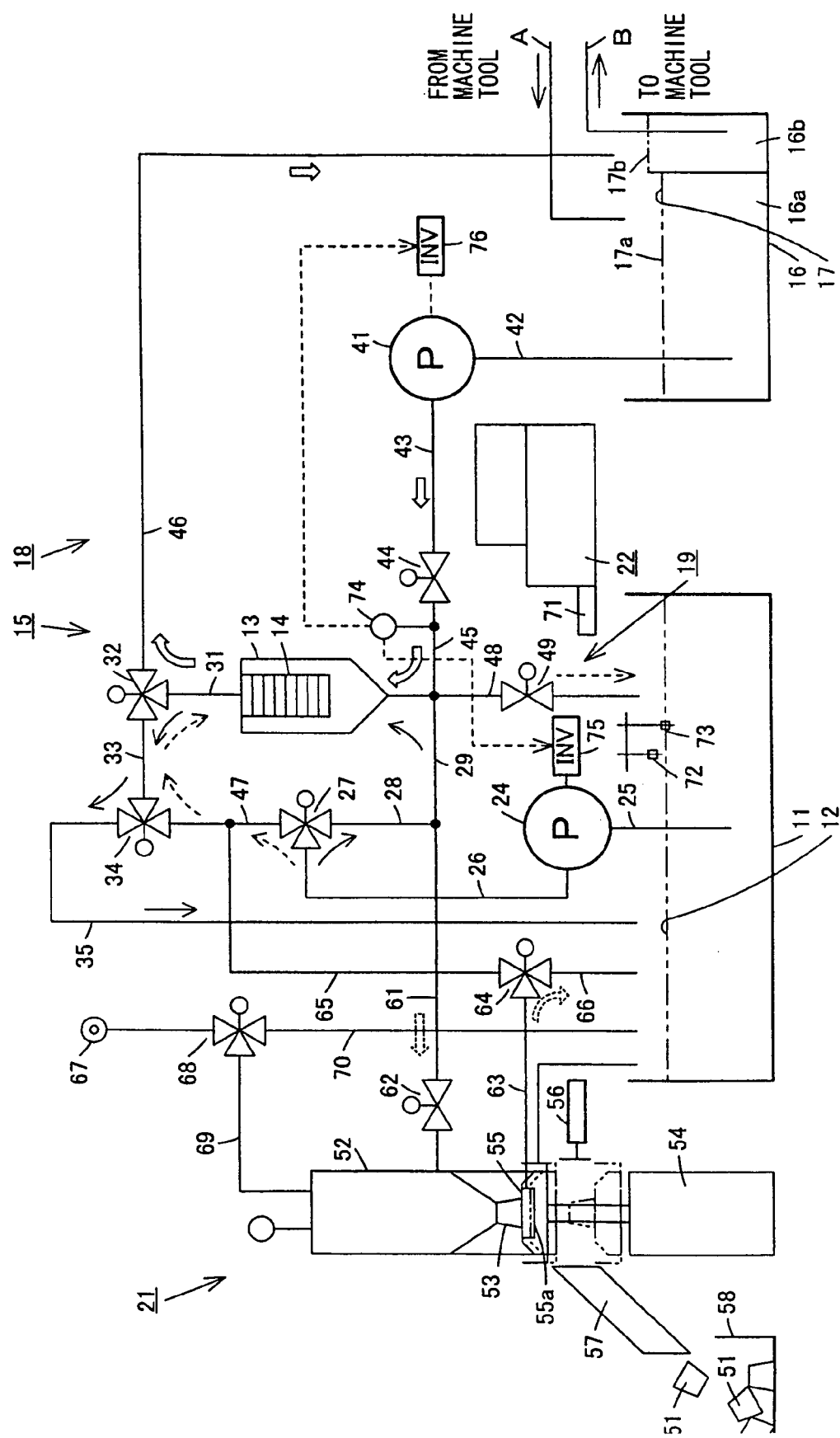
FIG. 1 is a circuit diagram showing one embodiment of the filtering method and filtering device according to the present invention.

As shown in FIG. 1, provided are a filter auxiliary agent pre-coat circuit 15 which attaches and stacks a filter auxiliary agent contained in a filter auxiliary agent liquid 12 in a pre-coat tank 11 to the outer surface of a filter element 14 attached in a filter case 13 to form a filter auxiliary agent layer; a filter circuit 18 which removes sludge in a filter treatment liquid 17 in a main tank 16 by using the filter auxiliary agent layer of the filter element 14; a backwashing circuit 19 which breaks down the filter auxiliary agent layer and the sludge layer growing on the surface of the filter auxiliary agent layer, separates the filter auxiliary agent layer and the sludge layer by backwashing from the filter element 14 and circulates to the pre-coat tank 11; a recovery device 21 which takes out the filter auxiliary agent and the sludge to the exterior from the backwashing circuit 19; and a filter auxiliary agent charging device 22 replenishes the filter auxiliary agent to the pre-coat tank 11.

Although the filter auxiliary agent is mainly composed of diatomaceous earth, pulp powder and activated carbon powder or the like may be added. The filter auxiliary agent is attached and stacked on the outer surface of the filter element 14 by passing the filter auxiliary agent liquid containing the filter auxiliary agent to the inside from the outside of the filter element 14 and circulating the filter auxiliary agent liquid repeatedly. Thereby the filter auxiliary agent layer can be formed. Fine sludge and particles can be trapped by the filter auxiliary agent layer.

The filter auxiliary agent pre-coat circuit 15 has the following structure. A suction pipe line 25 of a pre-coat pump 24 is inserted into the pre-coat tank 11. A discharge pipe line 26 of the pre-coat pump 24 is communicated with the lower part of the filter case 13 through a three-way changeover valve type solenoid valve 27 and pipe lines 28 and 29. The inside of the filter element 14 fixed to the upper part of the filter case 13 is communicated with the pre-coat tank 11 through a pipe line 31, a three-way changeover valve type solenoid valve 32, a pipe line 33, a three-way changeover valve type solenoid valve 34 and a pipe line 35. The filter auxiliary agent is attached and stacked on the outer surface of the filter element 14 by flowing the filter auxiliary agent liquid 12 accommodated in the pre-coat tank 11 and containing the filter auxiliary agent in the forward direction to the filter element 14, and circulating the filter auxiliary agent liquid 12 to the pre-coat tank 11, and the filter auxiliary agent layer is formed.

The filter circuit 18 has the following structure. A suction pipe line 42 of a main pump 41 is inserted into an untreated tank part 16a of the main tank 16. A discharge pipe line 43 of the main pump 41 is communicated with the lower part of the filter case 13 through an opening/closing valve type solenoid valve 44 and a pipe line 45. The inside of the filter element 14 fixed to the upper part of the filter case 13 is communicated with a treated tank part 16b of the main tank 16 through the pipe line 31, the three-way changeover valve type solenoid valve 32 and a pipe line 46. An untreated filter treatment liquid 17a supplied through a piping A from a machine tool into the untreated tank part 16a of the main tank 16 set independently from the pre-coat tank 11 is flowed in the forward direction to the filter element 14, and is circulated to the treated tank part 16b of the main tank 16. Thereby, the sludge contained in the filter treatment liquid 17a is removed by the filter element 14 and the filter auxiliary agent layer formed on the outer surface of the filter element 14. The treated filter treatment liquid 17b is returned to the machine tool through a piping B by a pump (not shown) from the treated tank part 16b of the main tank 16.

The backwashing circuit 19 has the following structure. The discharge pipe line 26 of the pre-coat pump 24 is communicated with the inside of the filter element 14 through the three-way changeover valve type solenoid valve 27, a pipe line 47, the three-way changeover valve type solenoid valve 34, the pipe line 33, the three-way changeover valve type solenoid valve 32 and the pipe line 31. The lower part of the filter case 13 is communicated with the pre-coat tank 11 through a pipe line 48 and an opening/closing valve type solenoid valve 49 in the pipe line 48. When the filter auxiliary agent layer of the filter element 14 is clogged by the sludge layer, the filter auxiliary agent layer and the sludge layer are broken down by flowing the filter auxiliary agent liquid 12 contained in the pre-coat tank 11 in the opposite direction to the filter element 14. The filter auxiliary agent layer and the sludge layer are separated by backwashing from the filter element 14, and are circulated to the pre-coat tank 11.

The recovery device 21 takes out waste 51 in which the filter auxiliary agent and sludge from the backwashing circuit 19 are mixed with each other to the exterior. A waste storage part 53 for storing the waste 51 is provided at the lower part of a precipitation tank 52. A metal-net filter 55 provided movable vertically by an elevation device 54 is provided at the lower part of the waste storage part 53. A pusher cylinder 56 for pushing out the waste 51 is arranged on one side between the upper position and lower position of the metal-net filter 55. A chute 57 for guiding the waste 51 dropping is arranged on the other side, and a container 58 for accommodating the waste 51 is arranged at the underside of the chute 57. The lower part of the filter case 13 is connected to the intermediate part of the precipitation tank 52 through a pipe line 61 and an opening/closing valve type solenoid valve 62. The inside of an underside container 55a of the metal-net filter 55 can be communicated with any one of a pipe line 65 communicated with the pipe line 47 by a three-way changeover valve type solenoid valve 64 through a pipe line 63 and a pipe lines 66 communicated with the pre-coat tank 11. Further, a pressurized air source 67 such as an air compressor is connected to the upper part of the precipitation tank 62 through a three-way changeover valve type solenoid valve 68 and a pipe line 69. The pipe line 69 is also communicated with a pipe line 70 provided on the pre-coat tank 11 by the solenoid valve 68.

The filter auxiliary agent charging device 22 has a filter auxiliary agent charging port 71 projected on the pre-coat tank 11 so as to replenish the filter auxiliary agent taken out to the exterior by the recovery device 21 to the pre-coat tank 11.

An upper limit setting liquid level sensor 72 and lower limit setting liquid level sensor 73 for detecting the liquid level of the filter auxiliary agent liquid 12 are respectively provided in the pre-coat tank 11. When the lower limit setting liquid level sensor 73 detects that the liquid level is below the lower limit setting value, the three-way changeover valve type solenoid valves 32 and 34 or the like are provided as a switching valve for switching the filter treatment liquid 17 circulated in the filter circuit 18 into the pre-coat tank 11.

Further, a pressure sensor 74 for detecting a filter inlet pressure is provided at the pipe line 45 of the inlet side of the filter. Inverters 75 and 76 for receiving the signal of the pressure sensor 74 and controlling a pump revolving speed are provided to the pre-coat pump 24 and the main pump 41 so as to obtain the pump revolving speed according to the inlet pressure of the filter.

Figure 2:
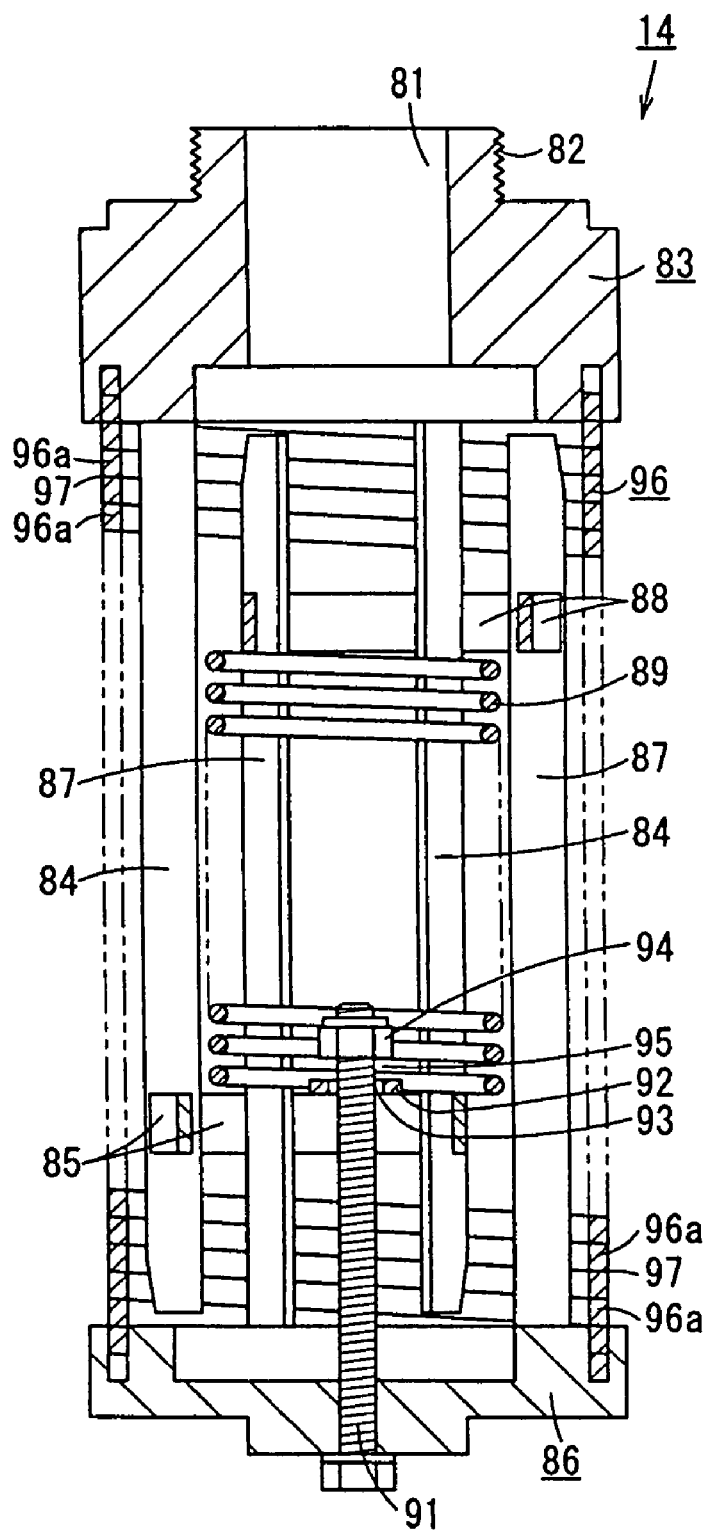
FIG. 2 is a sectional view showing the filter element of the filtering device.

As shown in FIG. 2, the filter element 14 has the following structure. A plurality of long size members 84 are projected downward from an upper member 83 having a hole 81 and a screw 82 for connecting to the pipe line 31. A lower spring receiving material 85 is integrally provided between the comparatively lower parts of the long size members 84. A plurality of long size members 87 are projected upward to the upper member 83 from a vertically freely movable lower member 86. An upper spring receiving material 88 is integrally provided between the comparatively upper parts of the long size members 87. A helical compression spring 89 is provided between both the spring receiving materials 85 and 88. The upper spring receiving material 88 is pushed up to the lower spring receiving material 85 by the helical compression spring 89. Further, the lower member 86 is energized upward through the long size member 87.

A screw rod 91 is screwed to be integrated at the central part of the lower member 86 from the lower side. The screw rod 91 is inserted into a hole 93 of a lock plate 92 fixed to the lower spring receiving material 85. The screw rod 91 is locked by screwing a nut 94 with the upper end part of the screw rod 91 projected upward from the hole 93. A space 95 in the axial direction is provided so that the lower member 86 can be slightly lowered between the nut 94 and the lock plate 92.

A series of metallic filters 96 formed in a coil shape are provided in a freely extendable and contractible manner between the upper member 83 and lower member 86 of such an attaching relationship. A convex part having a slight height integrally formed with a spiral part 96a between adjoining spiral parts 96a and 96a of the metallic filter 96 formed in the coil shape is interposed. Therefore, even if the spiral parts 96a and 96a are stuck to each other, a slight filtering space 97 is formed among them.

Thus, the filtering space 97 between the spiral parts 96a and 96a of the filter element 14 is set to the minimum according to the force energized in the compression direction by the helical compression spring 89 at the time of filtering. The filtering space 97 is enlarged within the space 95 in the axial direction by backwashing liquid pressure supplied into the metallic filter 96 from the hole 81 of the upper member 83 at the time of backwashing.

The long size members 84 and 87 are located at equal intervals at the outer peripheral part of the helical compression spring 89, and function as a guiding member of the helical compression spring 89, as well as located at equal intervals at the inner peripheral part of the metallic filter 96, and also function as the guiding member of the metallic filter 96.

Next, the action of the embodiment will be explained.

(Filter Auxiliary Agent Pre-coat Step)

The filter auxiliary agent is attached and stacked on the filter element 14 by flowing the filter auxiliary agent liquid 12 accommodated in the pre-coat tank 11 and containing the filter auxiliary agent in the forward direction to the filter element 14 and circulating to the pre-coat tank 11, and the filter auxiliary agent layer is formed.

In the filter auxiliary agent pre-coat step, the filter auxiliary agent liquid 12 containing the filter auxiliary agent in the pre-coat tank 11 is pumped up by the pre-coat pump 24. The filter auxiliary agent liquid 12 is supplied into the lower part of the filter case 13 through the solenoid valve 27 and the pipe lines 28 and 29 from the discharge pipe line 26. The filter auxiliary agent layer is formed by attaching and stacking the filter auxiliary agent in the filter auxiliary agent liquid 12 on the outer surface of the metallic filter 96 at the stage of flowing the filter auxiliary agent liquid 12 into the inside from the filtering space 97 of the metallic filter 96 of the filter element 14 fixed to the upper part of the filter case 13. The liquid flows into the pipe line 31 from the hole 81 of the upper member 83, and is returned to the pre-coat tank 11 through the three-way changeover valve type solenoid valve 32, the pipe line 33, the three-way changeover valve type solenoid valve 34 and the pipe line 35.

(Filtering Step)

The pre-coat pump 24 is stopped, and the solenoid valve 44 is opened. The solenoid valve 32 is switched, and the main pump 41 is driven. Thereby, the sludge contained in the filter treatment liquid 17 is removed by the filter auxiliary agent layer of the filter element 14 by flowing the filter treatment liquid 17 accommodated in the main tank 16 set independently from the pre-coat tank 11 in the forward direction to the filter element 14 and circulating the filter treatment liquid 17 to the main tank 16.

In the filtering step, the main pump 41 pumps up the filter treatment liquid 17a in the untreated tank part 16a of the main tank 16, and supplies the filter treatment liquid 17a into the filter case 13 through the discharge pipe line 43, the solenoid valve 44 and the pipe line 45. When the filter treatment liquid 17 is passed to the inside from the outer peripheral part of the filter element 14, the sludge contained in the filter treatment liquid 17 is removed by the filter auxiliary agent layer of the filter element 14. The filter treatment liquid 17b obtained by removing the sludge is transported to the treated tank part 16b of the main tank 16 through the pipe line 31, the solenoid valve 32 and the pipe line 46, and further is supplied to the machine tool.

As shown in FIG. 2, at the time of the filtering action, the lower member 86 is energized upward to the upper member 83 by the repulsion force of the helical compression spring 89 of the filter element 14. The metallic filter 96 formed in the coil shape between the upper member 83 and the lower member 86 is compressed to the shortest state. The liquid contained in the filter case 13 is moved into the metallic filter 96 through the slight filtering space 97 between the filter auxiliary agent layer and adjoining spiral parts 96a and 96a stacked and formed on the outer surface of the metallic filter 96 in this state. Thereby, a finer sludge than that of the filtering space 97 is also separated and removed from liquid by the filter auxiliary agent layer.

(Backwashing Step)

When the filter auxiliary agent layer of the filter element 14 is clogged by the sludge layer growing on the surface of the filter auxiliary agent layer, the filter auxiliary agent layer and the sludge layer are broken down by flowing the filter auxiliary agent liquid 12 contained in the pre-coat tank 11 in the opposite direction to the filter element 14, and the filter auxiliary agent layer and the sludge layer are separated by backwashing from the filter element 14, and are circulated to the pre-coat tank 11.

That is, the filter auxiliary agent liquid 12 discharged to the discharge pipe line 26 from the pre-coat pump 24 is supplied into the filter element 14 through the pipe line 47 switched by the solenoid valve 27, the pipe line 33 switched by the solenoid valve 34, the solenoid valve 32 and the pipe line 31. The filter element 14 is backwashed by the liquid pressure of the flow to the exterior from the inside of the opposite direction to that at the time of filtering.

At the time of the backwashing, the internal pressure in the metallic filter 96 of the filter element 14 is increased, and the lower member 86 is lowered by only the space 95 in the axial direction where the nut 94 is engaged with the lock plate 92. Thereby, since the filtering space 97 between the spiral parts 96a and 96a is enlarged, the sludge layer and the filter auxiliary agent layer are broken down by the enlarging operation between the spiral parts 96a and 96a of the metallic filters 96 and the backwashing liquid pressure blown out to the outer side from the filtering space 97. The filter auxiliary agent and sludge separated and dropped into the filter case 13 from the metallic filter 96 are returned into the pre-coat tank 11 through the pipe line 48 and the solenoid valve 49.

(Repetition of Filter Auxiliary Agent Pre-coat Step, Filtering Step and Backwashing Step)

The filter auxiliary agent pre-coat step, filtering step and backwashing step described above are repeated a plurality of times. In this case, the sludge is also mixed with filter auxiliary agent liquid in the filter auxiliary agent liquid contained in the pre-coat tank 11. However, when the filter auxiliary agent layer is formed on the outer surface of the filter element 14 in the second filter auxiliary agent pre-coat step, the sludge is dispersed in the filter auxiliary agent layer. Thereby, the filtering action is not prohibited until the sludge layer is formed on the surface of the filter auxiliary agent layer by the second filtering step.

(Recovery Step)

The filter auxiliary agent and sludge separated by backwashing from the filter element 14 are taken out to the exterior by the recovery device 21 after repeating the filter auxiliary agent pre-coat step, filtering step and backwashing step described above a plurality of times.

The recovery device 21 closes the solenoid valve 62 after accommodating the liquid containing the filter auxiliary agent and sludge backwashed from the filter element 14 in the precipitation tank 52 through the pipe line 61 and the solenoid valve 62. The liquid level in the precipitation tank 52 is pressurized by the air pressure supplied through the solenoid valve 68 and the pipe line 69 from the pressurized air source 67, and the liquid is passed through the waste storage part 53 and the metal-net filter 55. The filter auxiliary agent and sludge in the liquid are filtered on the metal-net filter 55 while the liquid is discharged to the pre-coat tank 11 through the pipe line 63, the solenoid valve 64 and the pipe line 66 from the underside container 55a.

Since the filter auxiliary agent and sludge filtered on the metal-net filter 55 become the waste 51 of a fixed form in the waste storage part 53, the waste 51 is also lowered by lowering the metal-net filter 55 using the elevation device 54. The waste 51 is pushed out to the other side by the pusher cylinder 56 of one side, and are stored in the container 58 through the chute 57.

(Filter Auxiliary Agent Charging Step)

The filter auxiliary agent taken out to the exterior with the sludge by the recovery device 21 is replenished to the pre-coat tank 11 by the filter auxiliary agent charging device 22.

The liquid is also replenished in the pre-coat tank 11. That is, the liquid level sensors 72 and 73 detect the liquid level of the filter auxiliary agent liquid 12 provided in the pre-coat tank 11. When the liquid level is below the lower limit setting value set by the liquid level sensor 73, the filter treatment liquid 17 circulated in the filter circuit 18, that is, the filter treatment liquid 17 supplied to the filter element 14 by the main pump 41 from the main tank 16 is supplied into the pre-coat tank 11 through the pipe line 35 by the switch of the solenoid valves 32 and 34. When the liquid level in the pre-coat tank 11 reaches the upper limit setting value set by the liquid level sensor 72, the replenishment of the liquid is stopped.

Next, the effect of the embodiment will be explained.

The filter auxiliary agent separated by backwashing from the filter element 14 can be repeatedly and effectively used by repeating the filter auxiliary agent pre-coat step for attaching and stacking the filter auxiliary agent contained in the filter auxiliary agent liquid 12 in the pre-coat tank 11 by the filter auxiliary agent pre-coat circuit 15 on the outer surface of the filter element 14 to form the filter auxiliary agent layer; and the filtering step for removing the sludge in the filter treatment liquid 17 in the main tank 16 by the filter auxiliary agent layer of the filter element 14 by the filter circuit 18; and the backwashing step for flowing the filter auxiliary agent liquid 12 in the pre-coat tank 11 in the opposite direction to the filter element 14 by the backwashing circuit 19 to break down the filter auxiliary agent layer and the sludge layer, separating the filter auxiliary agent layer and the sludge layer by backwashing from the filter element 14, and circulating to the pre-coat tank 11 when the filter auxiliary agent layer of the filter element 14 is clogged by the sludge layer growing on the surface of the filter auxiliary agent layer a plurality of times. Accordingly, the consumption amount of the filter auxiliary agent can be suppressed, and the generation of industrial waste can be suppressed. Thereby, the cost can be reduced.

The filter auxiliary agent and sludge by separated by backwashing from the filter element 14 by the backwashing circuit 19 are taken out to the exterior by the recovery device 21 after repeating the filter auxiliary agent pre-coat step, the filtering step and the backwashing step a plurality of times. The taken-out filter auxiliary agent is replenished to the pre-coat tank 11 from the filter auxiliary agent charging device 22. Thereby, the sludge can be discharged to the outside of the filtering system while the filter auxiliary agent having a degraded function is replaced with a new one.

The filtering space 97 formed between the adjoining spiral parts 96a and 96a of the metallic filter 96 is set to the minimum by the force energized in the compression direction at the time of filtering in the filter element 14 composed by the metallic filter 96 formed in the coil shape and provided so as to expand and shrink freely. Thereby, the filter auxiliary agent can be reliably attached and stacked on the metallic filter 96 to form the filter auxiliary agent layer. At the time of backwashing, the filtering space 97 between the spiral parts 96a and 96a of the metallic filter 96 is enlarged by the backwashing liquid pressure supplied into the metallic filter 96. Thereby, the filter auxiliary agent layer and sludge layer formed on the outer surface of the metallic filter 96 can be easily broken down, and reliably separated by backwashing.

The liquid level sensors 72 and 73 detect the liquid level of the filter auxiliary agent liquid 12 provided in the pre-coat tank 11, and the filter treatment liquid 17 in the main tank 16 circulated in the filter circuit 18 is supplied into the pre-coat tank 11 by the switching of the solenoid valves 32 and 34 when the liquid level is below the lower limit setting value of the liquid level sensor 73. Thereby, it is not necessary to set an independent water supply circuit to the pre-coat tank 11, and the equipment can be simplified.

What is claimed is:

1. A filtering method comprising the steps of:
   pre-coating a filter with an auxiliary agent by flowing a filter auxiliary agent liquid accommodated in a pre-coat tank and containing a filter auxiliary agent in a forward direction through a filter element to circulate the filter auxiliary agent liquid to the pre-coat tank and for attaching and stacking the filter auxiliary agent on the filter element to form a filter auxiliary agent layer;

filtering a filter treatment liquid accommodated in a main tank independent of said pre-coat tank, by flowing said filter treatment liquid in the forward direction through the filter element to circulate the filter treatment liquid back to the main tank, and for removing sludge contained in the liquid by the filter auxiliary agent layer of the filter element;

backwashing said filter by flowing the filter auxiliary agent liquid contained in said pre-coat tank in a direction opposite to said forward direction to separate both said filter auxiliary agent layer and a sludge layer from said filter element; and circulating said separated filter auxiliary agent layer and sludge layer to the pre-coat tank when the filter auxiliary agent layer of the filter element is clogged by the sludge layer, wherein the filter auxiliary agent pre-coat step, the filtering step and the backwashing step are repeated a plurality of times.

2. A filtering method according to claim 1, further comprising:

a recovery step for taking out the filter auxiliary agent and sludge separated by backwashing from the filter element to the exterior after repeating the filter auxiliary agent pre-coat step, the filtering step and the backwashing step a plurality of times; and a filter auxiliary agent charging step for replenishing the filter auxiliary agent taken out to the exterior in the recovery step to the pre-coat tank.

3. A filtering device comprising:

a filter auxiliary agent pre-coat circuit comprising means for flowing a filter auxiliary agent liquid accommodated in a pre-coat tank and containing a filter auxiliary agent in a forward direction through a filter element to circulate the filter auxiliary agent liquid to the pre-coat tank and for attaching and stacking the filter auxiliary agent on the filter element to form a filter auxiliary agent layer;

a filter circuit comprising means for flowing a filter treatment liquid accommodated in a main tank set independently from the pre-coat tank in the forward direction to the filter element and for circulating the filter treatment liquid to the main tank to remove sludge contained in the filter treatment liquid by the filter auxiliary agent layer of the filter element; and a backwashing circuit comprising means for flowing the filter auxiliary agent liquid in the pre-coat tank in a direction opposite to said forward direction through the filter element to break down the filter auxiliary agent layer and the sludge layer, separating both the filter auxiliary agent layer and the sludge layer from the filter element by backwashing, and comprising means for circulating to the pre-coat tank when the filter auxiliary agent layer of the filter element is clogged by a sludge layer.

4. The filtering device according to claim 3, wherein the filter element includes a series of metallic filters formed in a coil shape and provided so as to expand and shrink freely, and a filtering space formed between adjoining spiral parts of the metallic filters, set to the minimum according to the force energized in the compression direction at the time of filtering, and enlarged by backwashing liquid pressure supplied in the metallic filter at the time of backwashing.

5. The filtering device according to claim 3, further comprising:

a recovery device for taking out the filter auxiliary agent and the sludge to the exterior from the backwashing circuit; and a filter auxiliary agent charging device for replenishing the filter auxiliary agent taken out to the exterior by the recovery device to the pre-coat tank.

6. The filtering device according to claim 3, further comprising:

a liquid level sensor for detecting the liquid level of the filter auxiliary agent liquid provided in the pre-coat tank; and a switching valve for switching the filter treatment liquid circulated in the filter circuit to the pre-coat tank when the liquid level detected by the liquid level sensor is below a lower limit setting value.

* * * * *